United States Patent [19]
Erben et al.

[11] Patent Number: 5,349,699
[45] Date of Patent: Sep. 20, 1994

[54] RADIO RECEIVER WITH MASKING OF SWITCHOVER NOISE

[75] Inventors: Peter Erben, Seelze; Helmut Liman, Nordstemmen; Wilhelm Hegeler, Hildesheim; Harald Bochmann, Hanover; Jürgen Kässer, Diekholzen; Werner Henze, Hohnhorst, all of Fed. Rep. of Germany

[73] Assignee: Blaupunkt-Werke GmbH, Hildesheim, Fed. Rep. of Germany

[21] Appl. No.: 824,205

[22] Filed: Jan. 22, 1992

[30] Foreign Application Priority Data

Feb. 1, 1991 [DE] Fed. Rep. of Germany ....... 4103061
Feb. 1, 1991 [DE] Fed. Rep. of Germany ....... 4103064

[51] Int. Cl.$^5$ ............................................. H04B 1/16
[52] U.S. Cl. ...................... 455/186.1; 455/200.1; 455/303; 381/81
[58] Field of Search ............... 455/152.1, 184.1, 185.1, 455/186.1, 186.2, 187.1, 194.1, 200.1, 296, 303, 311; 381/81, 107, 123

[56] References Cited

U.S. PATENT DOCUMENTS 4,914,715 4/1990 Miyata .............................. 455/212
4,933,954 6/1990 Petry ................................ 375/1

FOREIGN PATENT DOCUMENTS

0403744A2 12/1990 Fed. Rep. of Germany .
1-29025 1/1989 Japan ............................. 455/186.1
1-53634 3/1989 Japan ............................. 455/186.1
2170712 7/1990 Japan ............................. 455/186.1

OTHER PUBLICATIONS

Texas Instruments, Dallas, Tex., *TMS 320 Family Development Support Reference Guide*, cop. 1986, pp. 9-5, 9-6, 9-7, A-5, BQ.
Motorola, Inc., Austin, Tex., *Microprocessor, Microcontroller and Peripheral Data*, vol. 2, pp. 3-1563 through 3-1565 and 3-1605 (Pinout of MC 68 HC 11 E9); Third Printing, 1988.
Patent Abstracts of Japan, vol. 6, No. 182 (E-131), 18 Sep. 1982 abstracting Fujii/Fujitsu publication 57-095 746 of 14 Jun. 1982.
Patent Abstracts of Japan, vol. 13, No. 198 (E-756), 11 May 1989 abstracting Kato/N.E.C. publication 1-019 of 23 Jan. 1989.

*Primary Examiner*—Reinhard J. Eisenzopf
*Assistant Examiner*—Chi Pham
*Attorney, Agent, or Firm*—Frishauf, Holtz, Goodman & Woodward

[57] ABSTRACT

The Radio Data System (RDS) protocol promulgated by the European Broadcasting Union provides for alternate frequencies (AF) for the same broadcast. Receivers periodically switch over to such an alternate frequency, leading to momentary crackling noises. In a radio receiver having a device for temporary switchover from a received frequency to some other frequency, substitute signals are inserted into the audio signals that are interrupted during the temporary switchover. The substitute signals are formed from the audio signals before and optionally also after the temporary switchover.

14 Claims, 4 Drawing Sheets

RADIO RECEIVER WITH MASKING OF SWITCHOVER NOISE

CROSS-REFERENCE TO RELATED LITERATURE

European Broadcasting Union Technical Standard 3244-E, entitled SPECIFICATIONS OF THE RADIO DATA SYSTEM RDS FOR VHF/FM SOUND BROADCASTING (EBU Technical Centre, Brussels, Mar. '84, 60 pp.);

Cross-Reference to related patents and applications, assigned to Blaupunkt Werke GmbH or its partent Robert Bosch GmbH, the disclosures of which are hereby incorporated by reference:

U.S. Pat. No. 3,949,401, HEGELER et al., issued Apr. 6, 1976;
U.S. Pat. No. 4,435,843, EILERS & BRÄGAS, issued Mar. 1984;
U.S. Pat. No. 4,450,589, EILERS & BRÄGAS, issued May 1984;
U.S. Pat. No. 4,499,603, EILERS, issued Feb. 1985;
U.S. Pat. No. 4,862,513, BRÄGAS, issued Aug. 29, 1989, entitled RADIO RECEIVER WITH TWO DIFFERENT TRAFFIC INFORMATION DECODERS:
U.S. Ser. No. 447,578, DUCKECK, filed Dec. 7, 1989, COMPUTATION-CONSERVING TRAFFIC DATA TRANSMISSION METHOD & APPARATUS now U.S. Pat. No. 5,181,208;
U.S. Ser. No. 447,165, BRÄGAS & DUCKECK, filed Dec. 7, 1989, DIGITAL TRAFFIC NEWS EVALUATION METHOD, now U.S. Pat. No. 5,065,452, issued Nov. 12, 1991.

FIELD OF THE INVENTION

The invention relates generally to a radio receiver with a radio data system (RDS) decoder.

BACKGROUND

In known radio receivers having a device for decoding radio data signals—hereinafter called RDS receivers—and in particular car radios, a test is made from time to time as to whether a transmitter is worth receiving on a different frequency and furthermore whether it is broadcasting the same program. In the known RDS receivers, these tests require from 20 to 30 milliseconds and from 150 to 300 milliseconds, respectively, which leads to annoying crackling since no audio signal from the received frequency is available for that period of time.

In German patent application P 41 03 062, HENZE, filed Feb. 1, 1991 and corresponding U.S. Ser. No. 07/822,304, filed Jan. 17, 1992, a radio receiver is disclosed with which the relatively major interference (150 to 300 milliseconds long) can indeed be overcome. Nevertheless, a possible interference of brief duration, occurring particularly at high amplitudes of the audio signal, remains.

THE INVENTION

A primary object of the present invention is to make the interference caused by the test switchover to some other frequency inaudible.

Briefly, a first embodiment, of the radio receiver according to the invention, inserts substitute signals into the audio signals that are interrupted by the temporary switchover, and the replacement signals are formed by delaying and repeating a signal segment of the audio signals that was received before the temporary switchover.

In a second embodiment, substitute signals are inserted into the audio signals that are interrupted during the temporary switchover, and the substitute signals are formed from the audio signals before and after the temporary switchover.

The radio receiver according to the invention has the advantage that when a test switchover to some other frequency is made, there is no longer any perceptible annoying crackling whatever. A further advantage is that in radio receivers that already include digital signal processing, the additional expenditure, depending on the embodiment of the invention, amounts essentially to a digital memory or signal processor, and these are often already provided in any case for other tasks in the radio receiver.

The other frequency intrinsically may be an arbitrary one. Suitably, however, alternative frequencies for test purposes are received that are stored in a memory in the radio receiver as belonging to the same program chain.

A preferred application of the invention is to radio receivers with a RDS decoder, in which the radio data signal is received and decoded in the switched-over state. However, the invention is also applicable to receivers in which a different test of a different frequency takes place, for example, a measurement of the field intensity.

Another feature of the invention is that the time of the temporary switchover and the duration of the delay are dependent on a zero crossover of the audio signal. This makes it possible to fit the substitute signal in with a correct phase with respect to the carrier wave.

Another further feature provides that the highest-energy components of the audio signals in time segments before and after the temporary switchover are ascertained using Fourier analysis, and the highest-energy components are each interpolated between the audio signals before and after the temporary switchover. Fourier analysis is explained in *Digital Filters* by Richard W. Hamming (Prentice-Hall, New Jersey, 1983), in *Introduction to Digital Filters*, by Trevor Terrell (MacMillan, New York, 1980, 1983) and in numerous prior U.S. and foreign patents.

A particularly advantageous provision, in a radio receiver having a device for temporary switchover from a receiver frequency to some other frequency, is that monaural reception takes place during the temporary switchover. This has the advantage that all the provisions necessary to generate and fade in the substitute signal need to be made only once. This applies both to the expenditure for circuitry and for the expenditure for calculation, when processors are used.

It is advantageously provided that a switchover to monaural reception is already made before the temporary switchover, and a return to stereo reception takes place only at the end of the temporary switchover. This has the advantage that even the segments of the audio signals that are used to form the substitute signals are received monoaurally and so may be less impeded by interference.

Exemplary embodiments of the invention are described in further detail below, in conjunction with the drawings.

DRAWINGS

FIG. 1 is a block circuit diagram of a first exemplary embodiment;

FIG. 2, again in the form of a block circuit diagram, shows certain parts of a second exemplary embodiment;

FIG. 3 is a block circuit diagram of a third exemplary embodiment;

FIGS. 4a-h show timing diagrams of some signals that occur in the receiver of FIG. 3; and FIGS. 5a-c show further timing diagrams to explain the receiver of FIG. 3.

DETAILED DESCRIPTION

Figure 1:
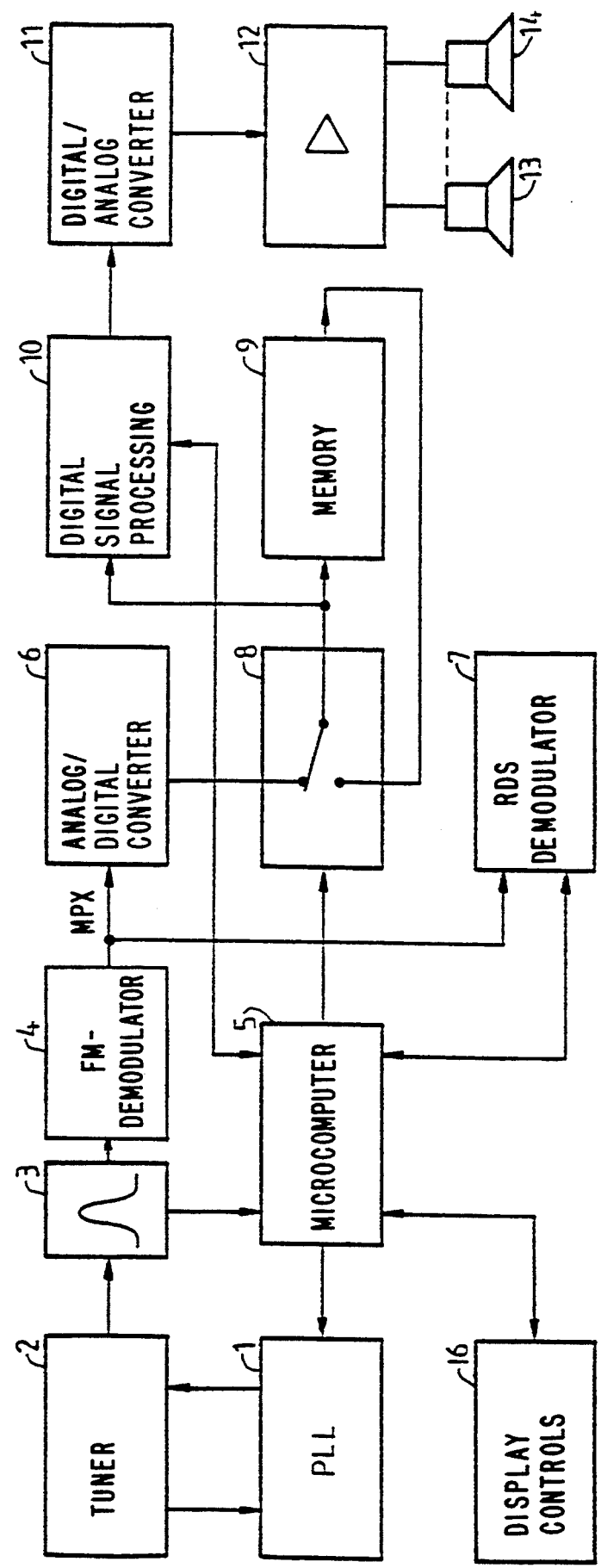

In the radio receiver of FIG. 1, tuning is done with the aid of a frequency phase-locked loop (PLL) 1, which is connected to the high-frequency part 2 in a manner known per se. The output signal of the high-frequency part 2 is fed through an IF (Intermediate Frequency) amplifier 3 to a demodulator 4. With the aid of a microcomputer 5, the tuning is controlled and the signal quality is also evaluated, to which end a suitable signal, such as the amplitude of the IF voltage, is delivered to the microcomputer 5 by the IF amplifier 3. Suitable microprocessors are commercially available from Intel, Motorola, Siemens, and other semiconductor companies. The microcomputer 5 is connected to a display and operation device 16 and to an RDS demodulator 7.

Connected to the output of the demodulator 4, which carries a multiplex signal MPX, are the input of an analog/digital converter 6 and one input of the RDS demodutator 7. Also controlled by the microcomputer 5 is a changeover switch 8, which selectively connects one output of the analog/digital converter 6 or one output of a memory 9 to the input of a digital signal processing circuit 10. Connected to the output of the digital signal processing circuit 10 is a digital/analog converter 11, the output signal of which can be supplied via power amplifiers 12 to loudspeakers 13, 14.

The digital signal processing circuit 10 can be controlled by the microcomputer 5; to that end, a suitable line connection between the two sets of components is provided. The memory 9 can preferably be implemented by a FIFO (First-In, First-Out) memory and have a capacity such that an audio signal can be stored in memory for the duration of the temporary interruption.

In normal operation, the changeover switch 8 is in the upper position, so that the audio signals received are supplied directly by the analog/digital converter 6 to the digital signal processing circuit 10. The audio signal received during the normal operation is written continuously into memory 9. Because of the properties of the FIFO memory, just as many sampling values are taken from the output of memory 9 as new ones are introduced, given suitable triggering. Thus the "latest" signal segment of a predetermined length always remains in the memory.

In known receivers with a test switchover to some other frequency, the signal path of the digital signal processing circuit 10 is interrupted during the reception of the other frequency. In the receiver according to the invention, however, the stored or memorized signal segment is used as a substitute signal. To this end, during a temporary switchover to the other frequency, the changeover switch is put into the other position by the microcomputer 5, so that the output signals of the memory 9 are supplied instead of the received audio signals to the digital signal processing circuit 10. In addition, the signals read out of the memory 9 are rewritten into the memory 9. As a result, the stored signals can be used numerous times as substitute signals.

The duration of the temporary switchovers to the other frequency can in principle be variously long. For instance, it may be possible for only one other frequency to be tested during a temporary switchover, while in another temporary switchover a plurality of other frequencies are tested in succession. For a radio receiver of this kind it may be advantageous to design the memory capacity such that it is adequate for the period of a normal temporary switchover, while the stored audio signal is read out many times in the case of longer switchovers, which may possibly occur less frequently.

On the one hand, in order to replace as extensively as possible for gaps in the audio signal caused by the temporary switchover, and on the other not to generate any additional interference as a result of the process of inserting the substitute signal, which may possibly not be correct in every respect, a further feature of the invention provides that a frequency band limitation takes place when the substitute signal is formed. Accordingly, the highest-energy spectral components of the audio signal in the range from 300 Hz (cycles per second) to 5 kHz (kiloHertz) are preferably used.

Figure 2:
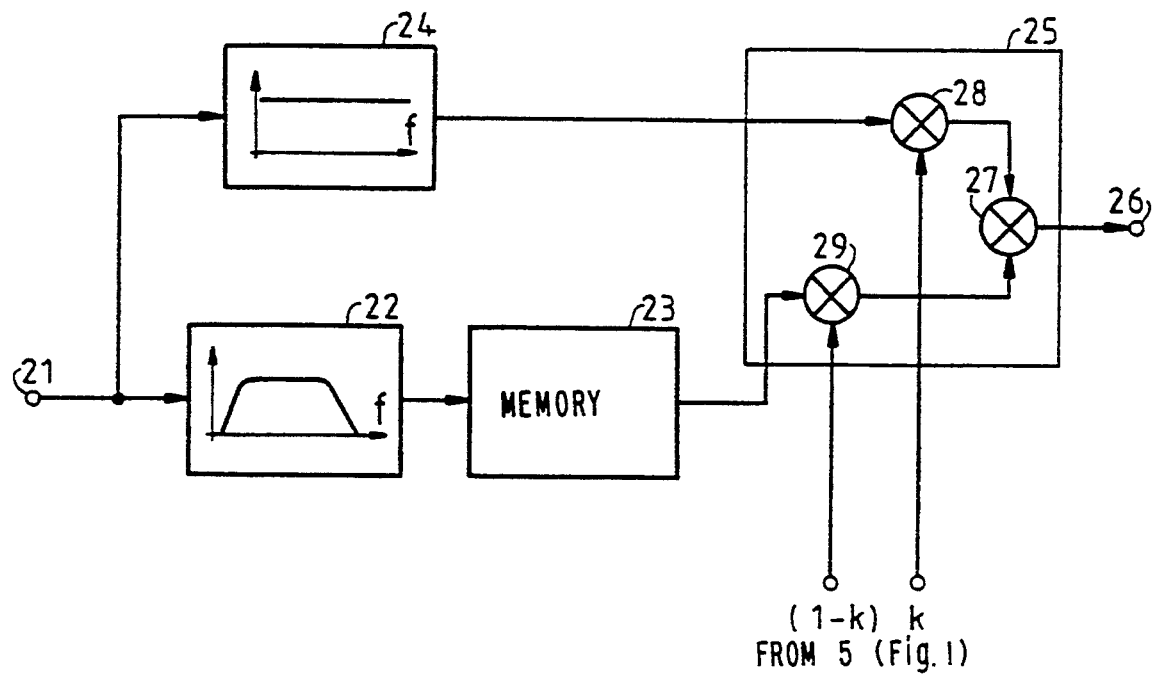

FIG. 2 shows part of a receiver according to the invention having this further feature. The digital audio signals are delivered by the analog/digital converter 6 (FIG. 1) via the connection 21 to a dissolve circuit 25, on the one hand via a band pass filter 22 and a memory 23 and on the other via an all-pass filter 24. From the output 26 of the dissolve circuit 25, the digital audio signals can be picked up for further processing and finally for reproduction. The dissolve circuit 25 comprises an adder 27 and two preceding multipliers 28, 29, to which factors k and (1−k) are supplied by the microcomputer 5 (FIG. 1). Upon reception of whichever frequency is selected, k=1, so that the digital audio signals. carried via the all-pass filter 24 reach the output 26 unaltered. At the same time, the most recently received signal segment is stored in the memory 23; with the aid of the bandpass filter 22, only the highest-energy components are taken into account.

At the beginning of a temporary interruption, k becomes equal to zero, so that (1−k) becomes equal to 1. The signal segment located in the memory 23 is thus fed to the output 26. During the dissolve time, which is short compared with the duration of the temporary switchover, an average value is formed between the unaffected digital audio signals and those read out from the memory 23. This reduces annoying jumps in amplitude and phase in the reproduced audio signal.

The circuits shown in the form of single function blocks in FIGS. 1 and 2 can also be combined individually to make larger units, depending on the conditions. For instance, with digital signal processors, it is possible to perform filter functions, arithmetic operations, and operations of writing into and reading out of the memory. Suitable digital signal processors are commercially available from Intel, Motorola, Siemens, and other semiconductor companies.

In the exemplary embodiment of FIG. 2, as a result of the band limitation of the audio signal to be stored in memory, the sampling frequency and thus the capacity of the memory can be reduced accordingly. Without making special provisions, a capacity of $S = 2 \times T \times Ft \times W$ is obtained for the memory, given two-channel transmission; Ft is the sampling frequency, W is the quantification accuracy, and T is the duration of the time segment to be stored in memory. If Ft=4.1 kHz, W=16 bits and T=46 ms, then a capacity of less than 64K is the result, and so economical standard components are available for the memory.

Figure 3:
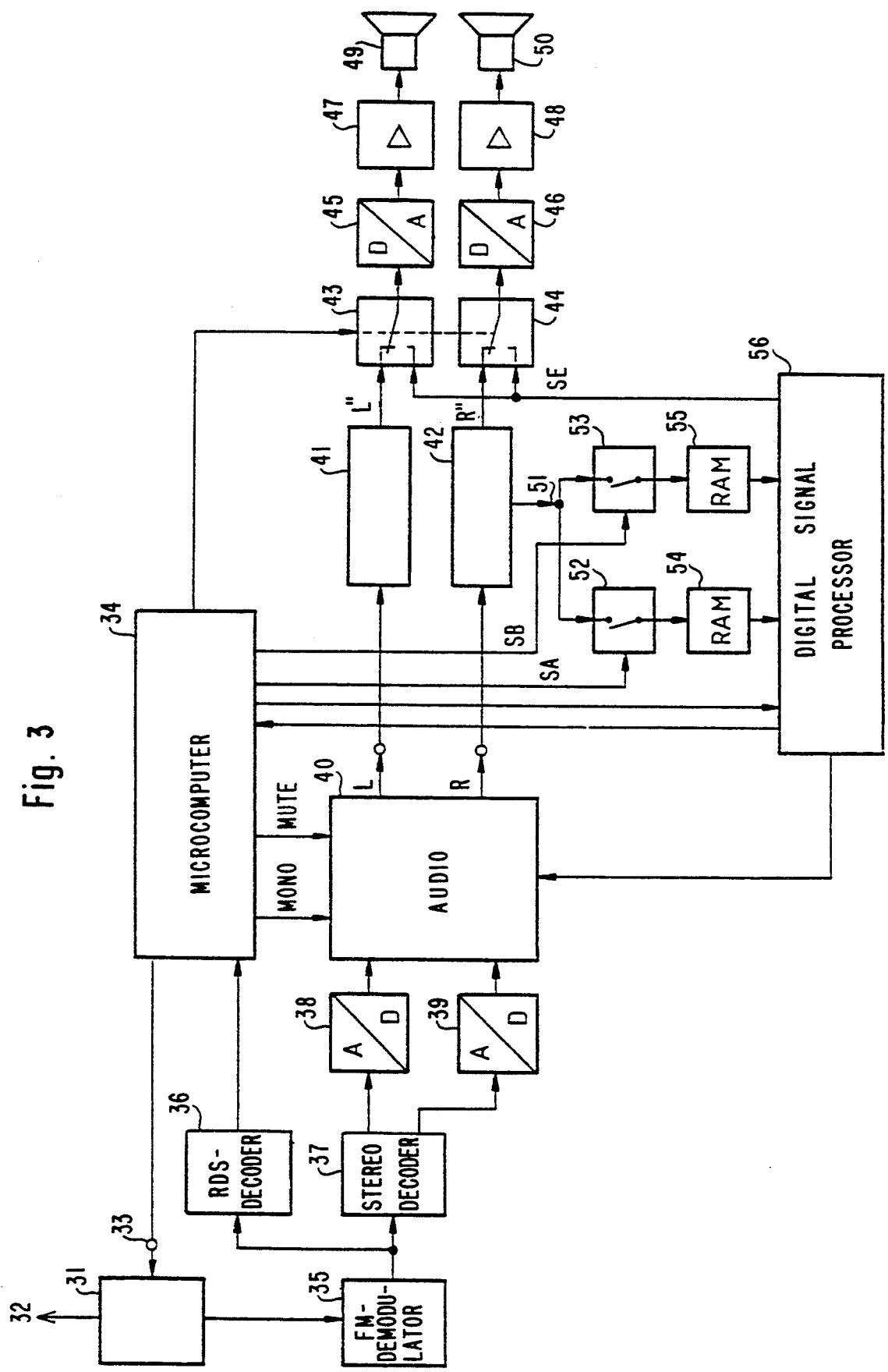

The radio receiver shown in FIG. 3 has a receiving part 31, which receives signals from an antenna 32 and which can be set to the particular frequency to be received via a control input 33 of a microcomputer 34. The receiving part 31 is followed by a frequency demodulator 35, the output of which is connected to an RDS decoder 36 and a stereo decoder 37. The output signal of the RDS decoder is supplied to the microcomputer 34 for further evaluation or display. The two audio signals are converted from analog to digital at 38, 39 and they reach a signal processing circuit 40, with the aid of which various adjustments can be performed, such as of the loudness and tone. The signal processing circuit 40 is also used for muting and switching over between mono and stereo by means of control signals that are supplied by microcomputer 34.

The audio signals L and R that appear at outputs of the signal processing circuit 40 are supplied to loudspeakers 49, 50, each via a respective delay device 41, 42, a controllable changeover switch 43, 44, a digital-/analog converter 45, 46, and an end stage 47, 48. The delay device 42 has an output 51, at which the audio signal R is delayed by only a small portion compared with the total delay time of the delay device 42. From this output 51, the delayed audio signal R can be written into read-write memories 54, 55, each via a respective controllable switch 52, 53. Outputs of the read-write memory 54, 55 are connected to inputs of a digital signal processor 56.

The controllable switches 52, 53 are controlled by the microcomputer 34. For exchanging data or control signals, the microcomputer 34, the signal processing circuit 40 and the digital signal processor 56 are connected directly to one another. In this connection it should be noted that the calculation operations for forming the substitute signals do not exhaust the capacity of the digital signal processor 56, so it is available for other tasks as well, such as tone control. loudspeaker control, or in a modification of the exemplary embodiment shown in FIG. 3, for demodulating the radio data signal.

The changeover switches 43, 44 that are controllable by the microcomputer 34 serve to carry either the delayed audio signals L, R or the substitute signals produced by the digital signal processor to the digital-/analog converter 45, 46.

In this connection, it should be noted that various details of FIG. 3 have been selected for the sake of simplicity. For instance, the changeover switches 43, 44 and the switches 52, 53 have been shown as mechanical switches; but in the case of a digital circuitry embodiment, typical logical circuits are used. Similarly, the read-write memories 54, 55 can be combined into one memory, and the signals can be written in and read out separately, by means of suitable addressing.

Figure 4:
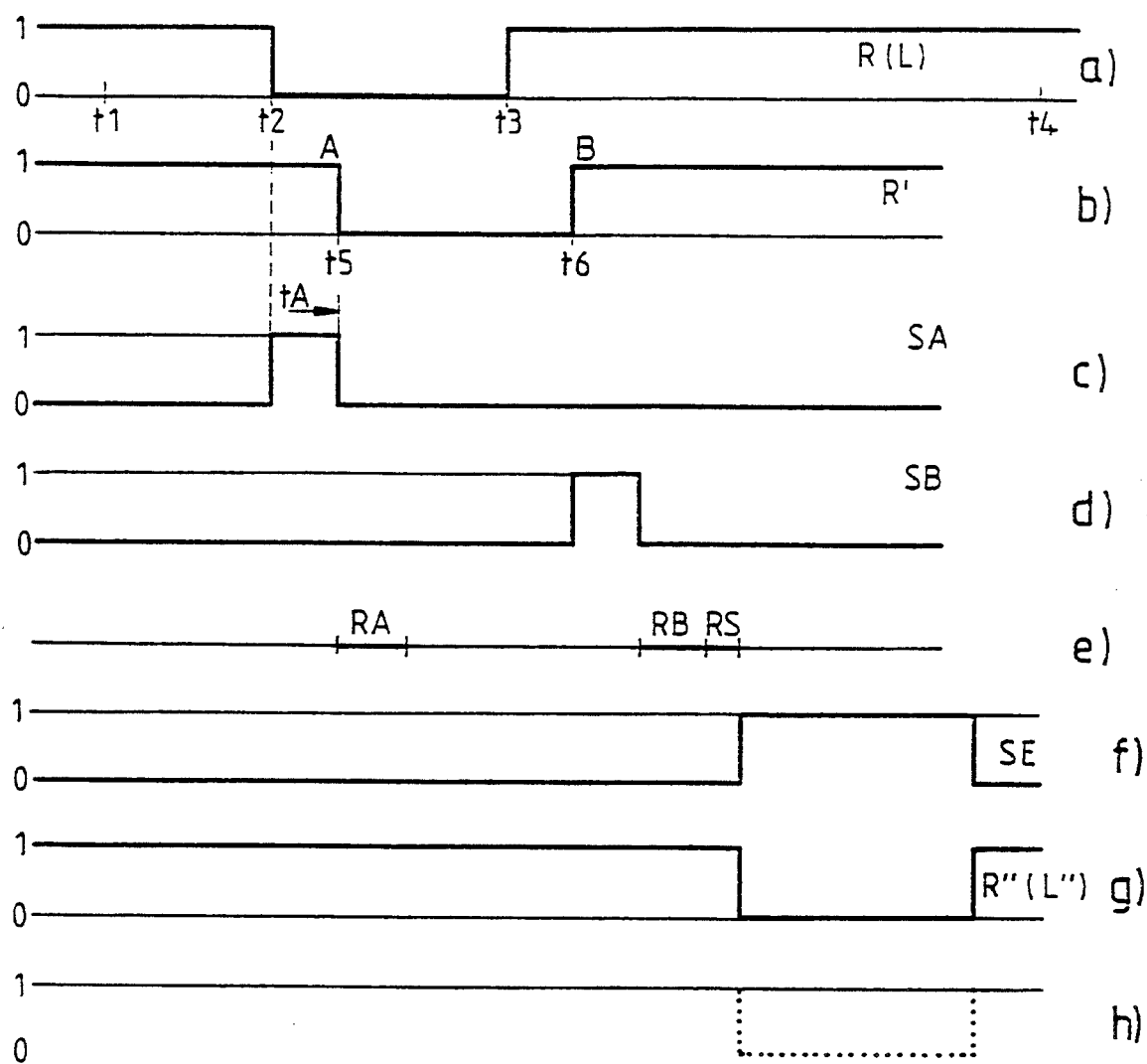

The events over time that take place upon the temporary switchover to another frequency will now be described for the receiver of FIG. 3, using the timing diagrams of FIG. 4. To represent the audio signals, digital signals have been shown, where 0 stands for "signal not present" and 1 stands for "signal present". Line a of FIG. 4 shows the audio signal R or L at the outputs of the signal processing circuit 40. At time T1, monaural reproduction is selected, so that the signals L and R are equal. At time t2, the muting begins on account of the temporary switchover of the received frequency. From time t3 on, reception of the originally received frequency is again possible, so that the audio signal resumes its previous level. Finally, monaural operation is turned off again at t4. The muting need not actually take place; this will become clear from the following functional description of the changeover switches 43, 44.

The delayed signal R' at the output 51 of the delay device 42 (FIG. 3) shown in line b of FIG. 4, is delayed compared with signal R by a time tA. Between times t2 and t5, the signal segment A prior to the beginning of the interruption of the signal R' is written into the read-write memory 54. Line c shows the control signal SA of the signal, output by the microcomputer 34, for controlling the switch 52. After the end of the interruption of the delayed signal R', beginning at time t6, a time segment B is written into the read-write memory 55 by closure of the switch 53; to that end, the microcomputer 34 imposes the control signal SB upon the switch 53.

Line e of FIG. 4 shows the calculation times RA and RB for analysis of the signal segments A and B, and a time segment RS for forming the substitute signal SE from the signals obtained by means of the analysis. After the time segment RS, the digital signal processor outputs the substitute signal SE, which is shown in line f, to the changeover switches 43, 44. The signal R" or L" shown in line g, which is delayed compared with the respective signal R or L by the entire transit time of the delay device 41, 42, is located at the respective other inputs of the changeover switches 43, 44. Line h schematically shows the audio signal filled up by the substitute signal.

In the calculation times shown in line e of FIG. 4, a Fourier analysis is carried out separately for the audio signal segments A and B in the digital signal processor 56, in which the highest-energy components are ascertained. The number of components determines the quality of the substitute signal SE; in most cases, a relatively low number, such as 3 or possibly even only 1, will be adequate. A Fourier analysis with rough graduations is also adequate.

To ascertain the components of the audio signal, the signal segment stored in the read-write memory 52 or in the read-write memory 53 is written into the digital signal processor. Once a signal segment has been written completely into the digital signal processor, a cycle in which the signal is delivered to the input of a digital filter that is embodied by a corresponding program is ended. In order now to be able to extract the various components from the audio signal, the filter coefficients are changed after each cycle, until the spectrum of the audio signal has been run through. Instead of changing the coefficients, however, the clock frequency at which the audio signals are read out of the read-write memories may be changed in increments.

During each cycle, the digital signal processor ascertains whether the component of the audio signal obtained at the filter output is greater than one of the components that have already been stored in memory. As applicable, the stored component having the lesser amplitude is replaced by the new one. The amplitude, component, and optionally a value for the transient time or attenuation time, are stored in memory.

By reducing the number of cycles, it is possible to reduce the calculation time. Since the highest-energy components of the audio signal are seldom located in the frequency range above 8 kHz, this frequency range need not be taken into account. The sampling frequency for the signal segments of the audio signal that are used to form the substitute signal can thus be reduced as well. Accordingly, it is adequate for only every third sampled value of the audio signals to be written into the read-write memories 54, 55 via the switches 52, 53. This lowers the capacity of the read-write memories accordingly.

Less stringent demands in terms of accuracy of the substitute signal amplitude can be made as well, so that to generate the substitute signal, a lower amplitude resolution can be used.

Figure 5:
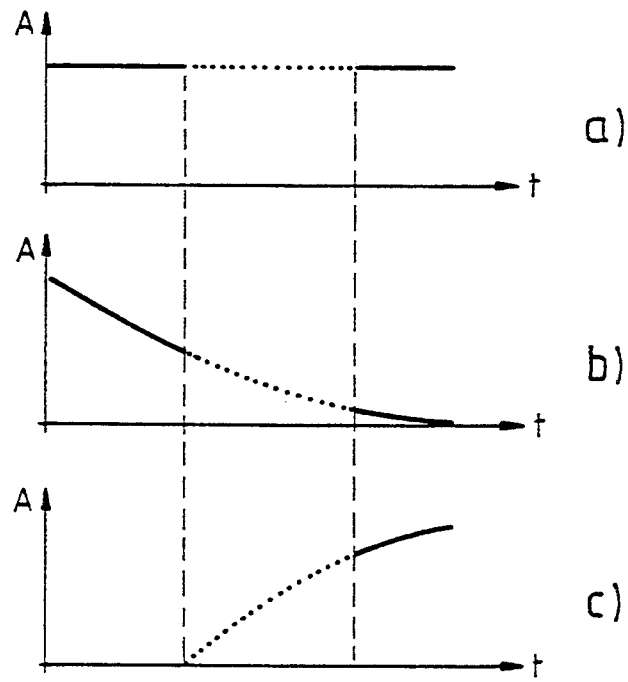

Once the component of the audio signal segments A and B have been ascertained, the substitute signal SE is ascertained from the components of both signal segments with the aid of a further program in the digital signal processor. In FIG. 5, the envelope curve of three different courses of the amplitude of a component are shown. In line a, the amplitudes during the signal segments A and B of the audio signal are equally high, so that the substitute signal SE is constant. In the cases of the course shown in line b of FIG. 5, the amplitude of the component decreases within the range of the signal interruption. Accordingly, to generate the signal SE, interpolation should be done between a greater amplitude at the beginning of the interruption and a smaller amplitude at the end of the interruption.

Finally, line c of FIG. 5 shows the case in which the component is not present in the signal segment A, while it has already attained a certain magnitude in the signal segment B. Once again, a suitable interpolation is performed. The interpolations can also be performed in accordance with exponential functions.

The addition of all the calculated signal component interpolations at the correct time produces the substitute signal SE, which is available immediately thereafter and is delivered to the digital/analog converters instead of the audio signal via the changeover switches 43, 44.

Various changes and modifications may be made, and features described in connection with any one of the embodiments may be used with any of the others, within the scope of the inventive concept.

| Ref. | IC-Typ. | Model-Nr. | Manufacturer |
| --- | --- | --- | --- |
| (5) | Mikroprozessor | MC 68 HC 11 E 9 | Motorola |
| (6) | ADC | 1/2 C S 4215 | Crystal |
| (7) | RDS-Demodulator | TAA 7579 | Philips |
| (9) | Memory | HM 6787 | Hitachi |
| (10) | Digitalsignal-processor | TMS 325 c | Texas Instruments |
| (11) | DAC | 1/2 CS 4215 | Crystal |

We claim:
1. In a radio receiver having
   storing means (9; 41, 42) for continuously storing a most-recently-received portion of a radio transmission; and
   switchover means (1, 5, 34) for automatic switchover from a first reception frequency to a second reception frequency,
   a method of suppressing audio output of noise during a switchover from a first reception frequency to a second reception frequency, comprising the steps of:
   continuously storing said most-recently-received transmission portion;
   upon cessation of audio signals received at said first reception frequency, retrieving, from said storing means (9; 41, 42), said most-recently-received transmission portion and directing audio output thereof as a substitute signal;
   repeating audio output of said most-recently-received transmission portion until audio signals are received at said second reception frequency; and
   performing a dissolve or temporary averaging between said most-recently-received transmission portion and said audio signals received at said second reception frequency, during transition therebetween, thereby minimizing jumps in amplitude and phase of a resulting audio output signal.

2. The method of claim 1, wherein said storing step comprises storing only a predetermined audio frequency band component of said most-recently received portion of a radio transmission.

3. The method of claim 2, wherein said storing step comprises storing only a signal in a frequency range from approximately 300 Hz to 5 kHz.

4. The method of claim 1, wherein said storing step comprises storing said most-recently received portion of a radio transmission for delay purposes in a First-In-First-Out (FIFO) digital memory.

5. The method of claim 1, wherein said switchover is detected by determining a zero crossover of the audio signal.

6. The method of claim 1, characterized in that
   each received portion of a radio transmission consists of a plurality of different audio frequency spectral components of differing energies; and
   the highest-energy spectral components are ascertained with the aid of Fourier analysis from audio signals in time segments before and after the switchover, and the highest-energy components are each interpolated between the audio signals before the switchover and after the switchover.

7. The method of claim 6, wherein a read-out clock pulse, for audio signal segments stored in memory in said storing means, is altered incrementally.

8. The method of claim 1, wherein a radio data system (RDS) signal is received and decoded during the switchover.

9. A method according to claim 1, wherein, during the switchover, only mortaural signals are fed from said storing means for output.

10. The method of claim 9, characterized in that wherein a switchover to repetition of monaural signals retrieved from said storing means is already made before the switchover, and that a switch back to stereo reception takes place only after the end of the switchover.

11. A radio receiver having
    a tuner (31);
    a stereo decoder (37) connected to an output of said tuner (31);
    a pair of analog-to-digital converters (38, 39), each having an input connected to said stereo decoder (37), and an output furnishing a digital channel signal;

a microprocessor (34) having a control output (33) which controls said tuner (31) and including means for automatic switchover from a first reception frequency to a second reception frequency;

audio processing means (40), coupled to said outputs of said pair of analog-to-digital converters (38, 39), for producing audio output signals and switching between a stereo reception mode and a monaural repetition mode:

storing means (54, 55), coupled to an output (R, 42, 51) of said audio processing means (40), for continuously storing a most-recently-received portion of a radio transmission for subsequent use in generation of substitute output signals;

a digital-to-analog converting output stage (45–50); and switch means (43, 44), coupled to selectively receive said audio output signals or substitute output signals from said storing means, and responsive to signals from said microprocessor (34) directing automatic switchover from one reception frequency to another, for suppressing audio output of noise during said switchover by feeding said substitute output signals (SE) to said output stage (45, 46) instead of audio output signals from said audio processing means (40).

12. The radio receiver of claim 11, wherein said switch means for suppressing audio output of noise includes a digital signal processor (56) which performs a Fourier analysis and determines which substitute signals to furnish to said digital-to-analog output stage (45, 46);

said storing means includes a plurality of read-write memories (54, 55) for storing audio signal segments, and said digital signal processor (56) includes a digital filter which scans the spectrum of the stored audio signal for highest energy spectral components by altering the filter coefficients of the digital filter.

13. The radio receiver of claim 11, characterized in that said audio output signals of said audio processing means (40) are connected via one delay device (41, 42) each and one switch means (43, 44) each to said output stage (45, 46);

said substitute output signals are delivered to said switch means (43, 44) by a digital signal processor (56); and inputs of the digital signal processor (56) are connected to said storing means (54, 55), into which the audio signals are written in time segments before and after the brief switchover.

14. The radio receiver of claim 12, further comprising a pair of delay elements (41, 42), connected between said audio processing means (40) and said switch means (43, 44), and wherein one (42) of said delay elements has a tap (51), which is connected to a pair of parallel switches (52, 53), by way of which a most-recently-received portion of the radio transmission reaches said read-write memories (54, 55), and wherein the parallel switches (52, 53) are controlled by said microprocessor (34).

* * * * *